Figure 1:
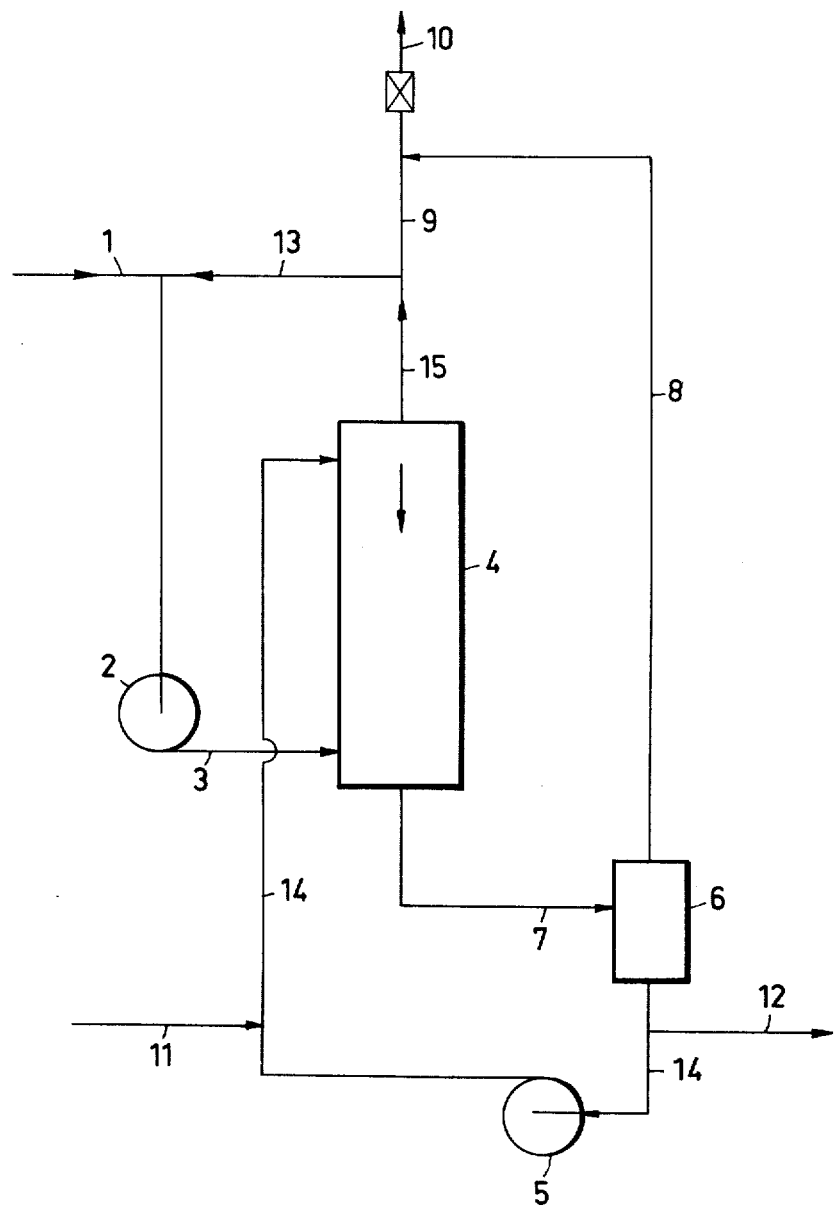

United States Patent [19]

Graf et al.

[11] 3,954,946

[45] May 4, 1976

[54] PROCESS FOR REACTING NITRIC OXIDE WITH HYDROGEN

[75] Inventors: Werner Graf, Chur; Johann Karl Forrer, Domat-Ems, both of Switzerland

[73] Assignee: Inventa AG fur Forschung und Patentverwertung, Zurich, Zurich, Switzerland

[22] Filed: July 18, 1974

[21] Appl. No.: 489,621

[52] U.S. Cl. .................................. 423/387; 55/36; 55/48; 55/51
[51] Int. Cl.² ........................................ B01D 19/00
[58] Field of Search .............. 55/36, 37, 48, 51, 56, 55/159; 423/387

[56] References Cited
UNITED STATES PATENTS

| | | | |
|---|---|---|---|
| 2,628,888 | 2/1953 | Benson | 423/387 |
| 3,295,925 | 1/1967 | Fueg et al. | 423/387 |
| 3,333,399 | 8/1967 | Robinson et al. | 55/56 |
| 3,649,170 | 3/1972 | Heine et al. | 423/387 |

Primary Examiner—Charles N. Hart
Assistant Examiner—Richard W. Burks
Attorney, Agent, or Firm—Bierman & Bierman

[57] ABSTRACT

Method and apparatus for reacting nitric oxide with $H_2$ in the presence of noble metal catalysts in which waste gas is obtained by separating the gas contained in a liquid medium flowing countercurrently to the bubbles in a counter-current bubble column. Preferably, only a portion of the separated gas is removed as waste gas, the remainder being recycled. The apparatus comprises a counter-current bubble column having a gas recycling circuit to permit the recycling of excess NO contained in the separated gas.

8 Claims, 1 Drawing Figure

PROCESS FOR REACTING NITRIC OXIDE WITH HYDROGEN

The present invention relates to a process for reacting nitric oxide with hydrogen.

The reaction of NO with $H_2$ in acid solution in the presence of noble-metal catalysts is carried out for preparing hydroxylamine salts. The choice of a suitable catalyst is a prerequisite, selective hydrogenation of the NO to yield hydroxylamine being also necessary in addition to high reaction activity.

Economically carrying out the reaction to produce hydroxylamine salts which serve, for example, as a starting product for the commercially important synthesis of caprolactam may be achieved, inter alia, in bubble columns. In this case, if a suitable apparatus is used for distributing the gases in the liquid, the production of a flow of liquid in the opposite direction to the ascending bubbles yields the following advantages:

It makes it possible to carry the heat of reaction off outside the reaction chamber by means of cooling devices of simple design;

it allows an increase in the dwell time of the gas bubbles in the reaction chamber, along with the higher mass transfer associated therewith.

When continuously carrying out the reaction in a counter-current bubble column, adequate conversion values of the NO gas will not generally occur, so far as it is desired to achieve economically reasonable volume-time yields. However the amount of reacted NO can be increased by using a gas circuit.

Complete conversion cannot be obtained even by using a gas circuit, however, since the recirculation ratio of the amount of recycle gas to amount of top gas cannot be increased to any degree that may be desired. The reason for this is that the gaseous by-products formed during the reaction and, in particular, the inert constituents present in the charging gases in industrial operations must be removed as waste gas. NO-gas is in addition lost in the process of removing the waste gas.

It has been found that when a counter-current bubble column is employed, gas is discharged from the reaction chamber with the liquid if certain liquid charges are exceeded. Analysis shows that this gas contains little if any NO, which is surprisng.

Accordingly, the present invention relates to a process for reacting nitric oxide with $H_2$ in the presence of noble-metal catalysts which are suspended in an acid liquid, employing a counter-current bubble column having a gas circuit, which is characterized in that the waste gas to be removed from the reaction system in order to discharge the inert gases introduced with the NO and the $H_2$ and which arises from secondary reactions during the main reaction is obtained by separating gas from the medium flowing in the opposite direction to the bubbles after the same issues from the bubble column.

According to a preferred embodiment, the waste gas to be separated is produced by means of liquid charges of 80 – 350 m³/m² per hour.

Advantageously, only a proportion of the separated gas is removed as waste gas and the remainder is passed back into the gas circuit.

Taking advantage of these circumstances and further in accordance with this invention, in the catalytic hydrogenation of NO, an apparatus according to FIG. 1 was set up comprising a counter-current bubble column with a gas circuit, a liquid charge which entrained at least an amount of gas corresponding to the inert constituents to be discharged which, after the separation of the gas from the liquid, was discharged as waste gas. The waste gas yield was free from NO and allowed complete NO conversion to be achieved, which is a significant technical advance.

In an apparatus operated on the principle described, the lowest specific consumption of NO per quantity of hydroxlamine produced is achieved.

In addition to this economically favorable aspect, another prime advantage of the described process is that in a process in which NO is reacted with $H_2$, a waste gas is obtained which is free from NO and does not have to undergo any costly treatments before being given off into the atmosphere.

In a preferred embodiment of the invention, the gas mixture in the counter-current bubble column is split up by adjusting the flow of liquid such that a mixture of $H_2$ and inert gas with a comparatively high NO content is formed as top gas at the upper end of the column. As a result, a gas mixture practically free of NO is formed in conjunction with the liquid at the lower end of the counter-current bubble column. The gas mixture is then withdrawn at the bottom and separated from the suspension. This last mentioned gas mixture is divided into:

a. a portion which is returned to the gas circuit, and
b. waste gas which is so adjusted in quantity that the inert gases introduced with the fresh gases or formed in secondary reactions are discharged.

The process according to the invention will be explained with reference to FIG. 1. In the counter-current bubble column 4 there is produced a flow of liquid which is conveyed in the direction of the arrow from top to bottom, then through the line 7, the gas separator 6, the line 14 and the pump 5 and back to the upper end of the counter-current bubble column 4. A portion of the liquid which, in addition to the suspended catalyst, contains the desired end product (say hydroxylamine salt) and, if occasion arises, by-product (such as ammonium salt), is drawn off through the line 12 and replaced by a corresponding quantity of fresh liquid via the line 11.

On the other side, a gas mixture consisting of NO, $H_2$ and inert gases flows via the line 3 into the lower end of the counter-current bubble column. The last-mentioned gases, such as nitrogen, are partly introduced from the start and are partly formed during the reaction, such as nitrous oxide. The rate of flow of the liquid is so adjusted that larger bubbles ascend slowly and their content accumulates at the top of the column 4, while smaller bubbles are retained in the lower part of the column by the flow or brought back again into the lower part of the column by the said flow. Surprisingly, there accumulates in this way in the lower part of the column a gas mixture which is practically completely free of nitric oxide. The nitric oxide itself ascends, together with part of the hydrogen and inert gas. As far as the nitric oxide has not reacted through the catalyst suspended in the liquid to form the end product, it accumulates as top gas at the top of the column together with parts of the remaining constituents of the gas mixture, that is with part of the hydrogen and of the inert gases.

The gas which has accumulated in the lower part of the column is carried by the said flow of liquid via the line 7 into the gas separator 6.

The design of the gas separator is also adapted to take care of the problems which normally occur in practice, such as for instance high foam formation, which is done in conventional manner.

The gas is separated from the liquid in the separator 6 and conveyed through the line 8 into the line 9. Part of this gas (about 10–80% by mass) escapes, generally via a pressure relief valve, through the line 10. The remainder flows to the bubble column 4 via the line 9, then through the line 13, the gas circuit compressor 2 and the line 3. The liquid charge is so adjusted that the amount of gas separated in the gas separator 6 is greater than the amount discharged at 10.

The top gas, which has a NO content of about 5 – 15% by volume, escapes upwardly via the line 15 and is supplied to the circuit via the lines 13 and 3 together with the gas flowing from the line 9.

The introduction of the recycle branch 6-8-9 is novel. In this way, the top gas is prevented from being able to pass unused into the open air via the line 15-9-10, because in fact gas free from NO flows downwardly in the line 9, which prevents the ascent of the NO. As a result, with full assurance of pressure equalization in the system, firstly the yield of reacted NO is improved and secondly pollution of the environment by NO is avoided, which signifies a considerably technical advance.

Fresh $NO/H_2$ mixture of the conventional commercial purity is received in the part 13-2-3 of the gas circuit via the line 1 and introduced into the bubble column. In quantity, it corresponds approximately to those parts which are converted in the reaction chamber, plus those which are carried off via the line 10 for the purpose of discharging the inert gas constituents.

The advantages of the described principle in comparison with the conventional operation of a counter-current bubble column having a gas circuit, in which the waste gas is removed at the top of the column, will be illustrated with the aid of the following Examples.

In these Examples, "N" = "normal", i.e. conditions at 760 mm Hg and 0°C.

EXAMPLE 1

In an apparatus according to FIG. 1, 7.018 $Nm^3$ of $H_2$, 3,793 $Nm^3$ of NO and 0.789 $Nm^3$ of inert gases were fed per hour via the line 1 together with the recycle gas flowing in from the line 13, on the suction side of the gas circuit compressor 2, via the line 3 to the counter-current bubble column 4. The column was filled for the major part (four fifths of its height) with one of the known acid catalyst suspensions. This suspension, for its parts, flowed downwardly in the direction of the arrow through the bubble column 4, then through the line 7 and the gas separator (or one of the conventional gas separator systems) 6 and back into the bubble column 4 via the line 14 and the pump 5. A small part of the end-product containing liquid corresponding to the reacted NO plus $H_2$ was drawn off by means of the line 12, a corresponding amount of fresh catalyst suspension being supplied to the liquid circuit via the line 11. The amount of this catalyst suspension was so adjusted by means of the pump 5 that a liquid charge of 250 $m^3/m^2$ per hour was obtained in the bubble column. The quantity of gas separated from the flow of liquid by means of the gas separator 6 ($Nm^3$/hour) was conveyed via the line 8, for the larger part via the lines 9 and 13 to the suction side of the gas circuit compressor 2, and for the smaller part (1.916 $Nm^3$/hour) was discharged through the line 10 as waste gas. The waste gas was free from NO, corresponding to a NO conversion of 100%.

EXAMPLE 2 (Comparison Example)

Under similar conditions for the amounts of gas supplied and the liquid circuit as those indicated in Example 1, in an apparatus according to FIG. 1, which, however, was operated without a gas separator 6 and a line 8 for separating the entrained gas, the waste gas was discharged directly as a proportion of the top gas (in line 15) through the line 10 in an amount of 2,691 $Nm^3$/hour.

The NO content of the waste gas was 11.3% by volume, corresponding to 0.303 $Nm^3$/hour. The degree of NO conversion was 92%.

Modifications in and to the above described embodiments may be made by those skilled in the art. It is intended to cover all such modifications which do not depart from the spirit and scope of the invention as defined in the claims appended hereto.

What is claimed is:

1. In a process for the production of hydroxyl amine by reaction of NO and $H_2$ in the presence of at least one noble metal catalyst suspended in an acid liquid, the improvement which comprises introducing said liquid adjacent the upper end of a bubble column and flowing said liquid downwardly at a liquid flow rate, introducing said NO and $H_2$ adjacent the lower end of said column whereby large and small bubbles are formed in said liquid, adjusting said flow rate so as to permit said larger gas bubbles to rise and collect adjacent the top of said column to form top gas and to carry said smaller bubbles entrained in said liquid to the lower end of said column, removing said liquid and said smaller bubbles from the bottom of said column, separating said smaller bubbles from said liquid to form bottom gas, returning at least a part of said bottom gas and said top gas to said lower end of said column, returning part of said liquid to the upper end of said column and withdrawing the rest of said liquid, which liquid contains said hydroxylamine.

2. A process according to claim 1 wherein fresh NO and $H_2$ are introduced into said top and bottom gases before said gases enter said column.

3. A process according to claim 1 wherein fresh acid liquid and noble metal catalyst are introduced into said liquid before its entry into said column.

4. A process according to claim 1 wherein part of said bottom gas is withdrawn after leaving the lower end of said column.

5. A process according to claim 1 wherein the withdrawn liquid is replaced by fresh acid.

6. A process according to claim 1 wherein said acid is sulfuric acid.

7. A process according to claim 1 wherein said top gas comprises $H_2$ and inert gas having a high NO content and said bottom gas is substantially free of NO, including the step of separating said bottom gas into a first gas stream and a second gas stream, said first gas stream being returned to said column, said second gas stream being discharged as waste, the quantity of said discharged gas being approximately equal to the amount of introduced gas plus the amount of gaseous byproducts generated, less the amount used in the reaction.

8. A process according to claim 1 characterized in that the waste gas to be separated is discharged at liquid flow rates of 80–350 m³/m² per hour in said column.

* * * * *